US011865789B2

(12) United States Patent
Jacobs

(10) Patent No.: US 11,865,789 B2
(45) Date of Patent: Jan. 9, 2024

(54) MATERIAL WELDER

(71) Applicant: UltraCut Industries Pty Ltd, Carrum Downs (AU)

(72) Inventor: Garth Edward Jacobs, Mount Martha (AU)

(73) Assignee: UltraCut Industries Pty Ltd, Carrum Downs (AU)

( * ) Notice: Subject to any disclaimer, the term of this patent is extended or adjusted under 35 U.S.C. 154(b) by 91 days.

(21) Appl. No.: 17/607,418

(22) PCT Filed: Jun. 3, 2020

(86) PCT No.: PCT/AU2020/050558
§ 371 (c)(1),
(2) Date: Oct. 29, 2021

(87) PCT Pub. No.: WO2020/243773
PCT Pub. Date: Dec. 10, 2020

(65) Prior Publication Data
US 2022/0219404 A1 Jul. 14, 2022

(30) Foreign Application Priority Data
Jun. 3, 2019 (AU) .............................. 2019901903

(51) Int. Cl.
*B29C 65/20* (2006.01)
*B29C 65/22* (2006.01)
(Continued)

(52) U.S. Cl.
CPC ............ *B29C 65/20* (2013.01); *B29C 65/223* (2013.01); *B29C 65/229* (2013.01); *B29C 65/30* (2013.01);
(Continued)

(58) Field of Classification Search
CPC ..... B29C 65/20; B29C 65/223; B29C 65/229; B29C 65/30; B29C 66/81811; B29C 66/8322; B29C 66/91421
See application file for complete search history.

(56) References Cited

U.S. PATENT DOCUMENTS 3,272,674 A * 9/1966 Sachs .................. B29C 66/8322
156/583.3
3,291,963 A * 12/1966 Wetzel ................ B29C 65/1445
219/243
(Continued)

FOREIGN PATENT DOCUMENTS

DE 19732703 A1 * 2/1999 ........... B29C 65/224
GB 679644 9/1952

OTHER PUBLICATIONS

Translation of DE 19732703 A1, Feb. 1999, Leander U (Year: 1999).*
(Continued)

*Primary Examiner* — George R Koch

(57) ABSTRACT

A material welder for welding at least two portions of a weldable material together, including:
a top bar assembly and a bottom bar assembly, a portion of the top bar assembly directly above a portion of the bottom bar assembly, the top bar assembly including a first and second heating element substantially in the same plane and the bottom bar assembly including a first and second heating element substantially in the same plane,
at least one heating device adapted to selectively heat the first heating elements and/or second heating elements,
an actuator device adapted to move the top bar assembly towards the bottom bar assembly and/or the bottom bar assembly towards the top bar assembly, such that the first heating element of the top bar assembly aligns with
(Continued)

the first heating element of the bottom bar assembly and the second heating element of the top bar assembly aligns with the second heating element of the bottom bar assembly;

a contact surface of the top bar assembly and a contact surface of the bottom bar assembly adapted to contact the material during a welding process.

20 Claims, 11 Drawing Sheets

(51) Int. Cl.
  *B29C 65/30* (2006.01)
  *B29C 65/00* (2006.01)
(52) U.S. Cl.
  CPC .... *B29C 66/81811* (2013.01); *B29C 66/8322* (2013.01); *B29C 66/91421* (2013.01)

(56) References Cited

U.S. PATENT DOCUMENTS

| | | | |
|---|---|---|---|
| 4,430,146 A * | 2/1984 | Johnson | B29C 65/5057 |
| | | | 156/583.9 |
| 4,658,433 A * | 4/1987 | Savicki | B29C 65/18 |
| | | | 383/7 |
| 4,918,754 A | 4/1990 | Leatherman et al. | |
| 6,422,986 B1 * | 7/2002 | Claybaker | B29C 65/26 |
| | | | 493/197 |
| 2001/0008064 A1 | 7/2001 | Todd et al. | |
| 2004/0256058 A1 * | 12/2004 | Irwin | B29C 66/81821 |
| | | | 493/189 |
| 2020/0331648 A1 * | 10/2020 | Lees | B29C 66/1122 |

OTHER PUBLICATIONS

International Search Report and the Written Opinion dated Sep. 16, 2020 From the International Searching Authority Re. Application No. PCT/AU2020/050558. (8 Pages).

* cited by examiner

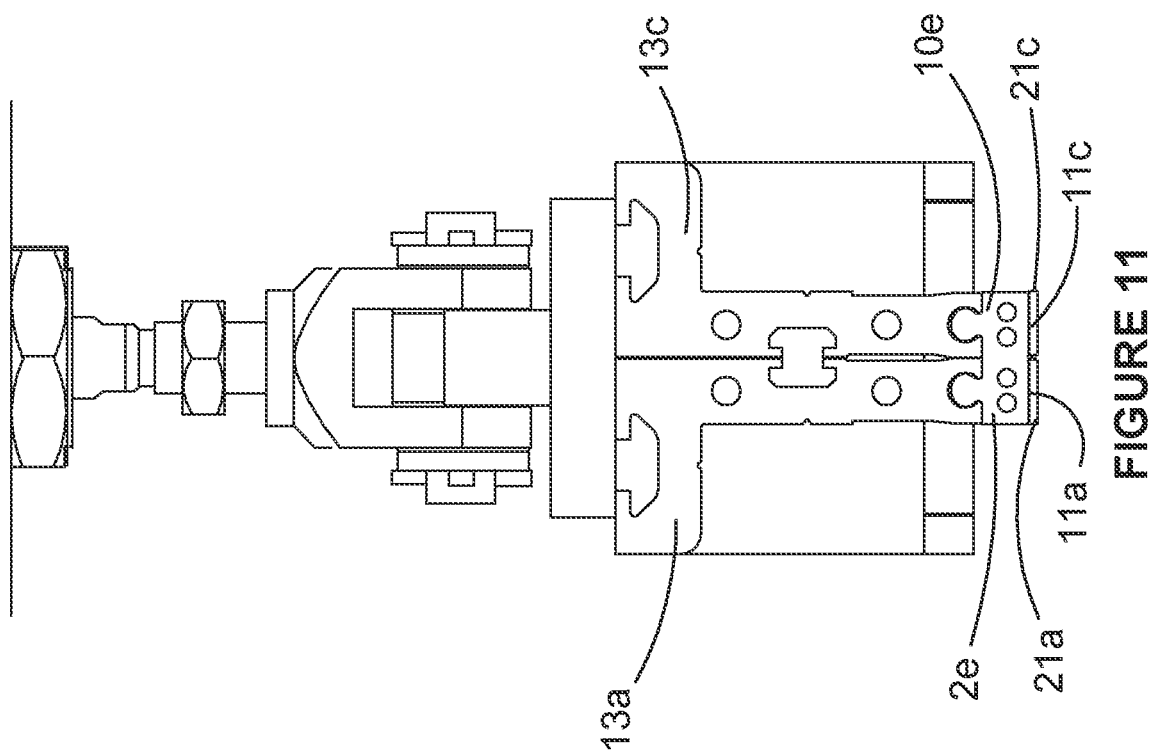

MATERIAL WELDER

RELATED APPLICATIONS

This application is a National Phase of PCT Patent Application No. PCT/AU2020/050558 having International filing date of Jun. 3, 2020, which claims the benefit of priority of Australian Patent Application No. 2019901903 filed on Jun. 3, 2019. The contents of the above applications are all incorporated by reference as if fully set forth herein in their entirety.

FIELD AND BACKGROUND OF THE INVENTION

This invention relates to a material welder. More particularly, this invention relates to a material welder for welding material made of weldable materials including plastic.

Welders for welding materials together have been described. Some material welders are used to weld materials together. These material welders include weld beams or bars that are heated then pressed onto the material to join the materials together. Typically the weldable materials include plastic.

Generally, the weld beam or bar of the material welders have a predetermined width such that they are only capable of forming a weld at a fixed width. However, different weld widths may be required in different situations. This means that a wider bar or a thinner bar may be required. In this situation it would be necessary to replace the bar or beam within the material welder or alternatively use a different material welder having the alternative bar or beam width. This may add significant costs and operators time when welding the material.

There exists a need to overcome, or at least alleviate, one or more of the difficulties or deficiencies associated with the prior art to at least provide a useful alternative thereto.

SUMMARY OF THE INVENTION

Accordingly, in one aspect of the invention there is provided a material welder for welding at least two portions of a weldable material together, including:

a top bar assembly and a bottom bar assembly, a portion of the top bar assembly directly above a portion of the bottom bar assembly, the top bar assembly including a first and second heating element substantially in the same plane and the bottom bar assembly including a first and second heating element substantially in the same plane, a heating device adapted to selectively heat the first heating elements and/or second heating elements, an actuator device adapted to move the top bar assembly towards the bottom bar assembly and/or the bottom bar assembly towards the top bar assembly, such that the first heating element of the top bar assembly aligns with the first heating element of the bottom bar assembly and the second heating element of the top bar assembly aligns with the second heating element of the bottom bar assembly;

a contact surface of the top bar assembly and a contact surface of the bottom bar assembly adapted to contact the material during a welding process.

Preferably, the welding process includes inserting the at least two portions of the material between the top bar assembly and the bottom bar assembly, the at least two portions of the material overlapping each other, heating the first heating element of the first top bar assembly and first heating element of the bottom bar assembly or, the second heating element of the top bar assembly and the second heating element of the bottom bar assembly or the first and second heating elements of the top bar assembly and the first and second heating element of the bottom bar assembly, then activating the actuator device to raise the bottom bar assembly and/or lower the top bar assembly until the contact surfaces contact and/or apply force to the material, then raising the top bar assembly and/or lowering the bottom bar assembly.

Preferably, the heating device may be adapted to selectively heat either the first heating elements or all the first and second heating elements. Preferably, the heating element may be laid directly under the contact surface of the assembly. Preferably, the heating elements are between about 5 to 20 mm wide, preferably between about 8 to 16 mm wide, most preferably about 10 mm wide. The heating elements may the same width or the first heating elements may have a different width to the second heating elements.

Preferably, the assembly further includes at least one hole and/or channel adapted such that fluid or air is circulated through the holes and/or channels and through a cooling device to cool the heating elements.

Preferably, the actuator device is adapted to move the top bar assembly towards the bottom bar assembly. The top bar assembly and bottom bar assembly include at least one weld bar and bar supports with interlocking features. Preferably, the interlocking features include a feature on the weld bar or bars which slots into and is captured by a channel on the bar supports.

Preferably, the material welder further includes an electronic controller which is adapted to control the actuator device, the heating device and the cooling device.

Use of the phrase "substantially in the same plane" throughout the specification means the two surfaces are within 5 degrees of parallel and planes on the surfaces have a minimum distance between each other of less than 10 mm. Use of the phrase "substantially parallel" throughout the specification means that at least 80% of the two surfaces or edges are within 5 degrees of parallel to each other. Unless otherwise stated use of the word "substantially" refers to above 80% by volume.

Material

The material for welding is weldable, such that the welding process uses the properties of the materials to be joined to hold them together so that no sewing, adhesive, seam tape or other fasteners are required to join them or can be used in conjunction with other joining methods. The material may be substantially made of the weldable material or coated with a weldable material.

The material may be a fabric or a fabric coated in a plastic. The material may be made of materials including plastic, metal, natural fibres or materials such as cotton and composites such as fibre glass. The main portion of the material may be substantially made of PVC, acrylic or vinyl. The material may substantially be made of PVC, acrylic or vinyl. The material may substantially be made of a fibre such as canvas coated in a plastic such as PVC. The fibres may be arranged in a woven pattern. The material may include multiple layers. The multiple layers may be welded or stitched together. The bead may include a rope positioned in a fold of the material. The material may include zips, eyelet loops or other features.

The material welder may be adapted to weld two or three portions of material together. The at least two portions of the material may include at least two portions of a single piece of material. The single piece of material may be folded such that a first portion of the material overlaps a second portion of the material. The at least two portions of material may include the first and second portion of the material. The at least two portions of the material may include at least two portions of multiple pieces of material. The at least two portions may include for example, at least one portion from a first continuous piece of material and at least one portion from a second continuous piece of material.

Bar Assembly

Preferably, the contact surface of the top bar assembly and/or contact surface of the bottom bar assembly are substantially flat. The contact surface of the top bar assembly and/or contact surface of the bottom bar assembly may be coated with of the non-stick material, preferably polytetrafluoroethylene (Teflon), fluorinated ethylene propylene, or similar non-stick materials, more preferably polytetrafluoroethylene (Teflon).

The top bar assembly may include a single weld bar or two parallel weld bars. The bottom bar assembly may include a single weld bar or two parallel weld bars. In this specification, the two parallel weld bars may be referred to as the first and second top bars and first and second bottom bars. The top weld bar or bars forms the portion of the top bar assembly that is directly above a portion of the bottom bar assembly. When two parallel weld bars are used in the assembly, they are held together such that they form a single contact surface.

An outer surface of the bar assembly includes the contact surfaces. Preferably, the contact surface is the upper most surface of the bottom bar assembly and the lower most surface of the top bar assembly. The outer surface of the bar assembly may also be adapted to contact the material during the welding process. Preferably, the outer surface/contact surface of the bar assembly is formed from the weld bar or bars.

The outer surface/contact surface of the bar assembly may include any pattern or shape. The outer surface/contact surface may include spikes, raised edges, raised faces and other features.

The outer surface/contact surface may be substantially flat. Substantially in that the outer surface/contact surface may also include radiused edges and a portion of perpendicular faces which also contact the material during the welding process.

The contact surface may include a lower face and side faces of the bar assembly which also contact the material during the welding process. Preferably, the outer surface/contact surface is flat. Preferably, the outer surface is the contact surface.

The weld bar or bars may be made of materials including metal, ceramic, non-stick materials and a composite such as fibre glass. The non-stick materials may include PTFE (polytetrafluoroethylene) commonly known as Teflon, FEP (fluorinated propylene) or other non-stick materials. The ceramics may include silicon, glass or other ceramics. Preferably, the weld bar or bars are substantially made of silicon with at least the contact surfaces of the bars including a non-stick material. The non-stick material may coat the main body of the bars. Preferably, the contact surfaces include a non-stick material covering the main body of the bars. The non-stick material may loosely cover the weld bar or bars. The non-stick material may be tightly clamped onto the weld bar or bars. The non-stick material may be held in place with bolts, clamps, bolted members such as elongate strips or other devices.

The material welder includes an actuator device to move the top bar assembly toward the bottom bar assembly and/or the bottom bar assembly towards the top bar assembly. Preferably, the top bar assembly is adapted to be moved by the actuator device. Preferably, the bottom bar assembly is not adapted to be moved by the actuator device, that is the bottom bar assembly is in a fixed position. The bar assembly may be attached directly to the actuator device. The bar assembly may include bar supports and the bar supports attach to the actuator device and/or support structure or tables. The bar assembly may be attached directly to the support structure or tables. Preferably, the top bar assembly may include bar supports and the bar supports are attached to the actuator device. Preferably, the bottom bar assembly may include bar supports and the bar supports attached to the support structure. The bar supports may be attached with bolts, screws, glue, welds, interlocking components or other attachment means.

Preferably, the top bar assembly and bottom bar assembly include a first and second top bar support (top bar supports) and a first and second bottom bar support (bottom bar supports) respectively. Preferably, the bars supports may be attached with interlocking features. Preferably, the interlocking feature is an elongate feature that slots into elongate channels in the bar supports. Preferably, the top bar supports are attached to the actuator device with bolts. Preferably, the bottom bar supports are attached to the support structure with bolts.

The top bar assembly and bottom bar assembly may include holes, channels or other features to receive components of the cooling device and/or the heating device.

The following refers to a thermally and/or electrically insulative material. The surfaces of the top bar assembly and bottom bar assembly not including the contact surfaces may be covered in an insulative material. An insulative material may cover the top and bottom bar supports. An insulative material may be located between the two parallel top weld bars and/or between the first and second top bar supports. An insulative material may be located between the two parallel bottom weld bars and/or between the first and second bottom bar supports. An insulative material may be located between the top weld bars and the top bar supports and/or between the bottom bar and the bottom bar supports.

The top bar assembly and bottom bar assembly may be any length. The top bar assembly and bottom bar assembly may be between 1 metre (m) and 10 m in length. Preferably, a first version of the material welder includes bars with a length of between 3 m and 3.4 m. Preferably, a second version of the material welder includes bars with a length of between 6 m and 6.8 m.

The top bar assembly and bottom bar assembly may be of variable width. Preferably, the width accommodates the width of the first and second heating elements.

The bar assembly may include two or more parallel weld bars. The bar assembly may further include any number of top and bottom parallel weld bars, each of the top weld bars substantially in the same plane and each of the bottom weld bars substantially in the same plane. Wherein, each of the top and bottom weld bars may be selectively heated by the heating device.

The portion of the top bar assembly may be part of the top bar assembly or all of the top bar assembly. Preferably, the portion of the top bar assembly is a portion making up at least 80% by volume of the top bar assembly. The portion of the bottom bar assembly may be part of the top bar assembly or all of the top bar assembly. Preferably, the portion of the bottom bar assembly is a portion making up at least 80% by volume of the bottom bar assembly.

Heating Device and Heating Elements

The heating device may include multiple heating devices. The heating device may include a fluid circulation system with a fluid circulating through at least one hole in the bar assembly and through a heater. The heating device may include at least one Peltier device. The heating device may include radiators. Preferably, the heating device includes heating elements. The heating elements may be made of materials including nickel, chromium and other typical heating element materials. The heating elements may be wound in a spiral. The heating elements may include a straight wire. The heating elements may be arranged in other patterns.

Each bar assembly includes a first and second heating element. Preferably, the heating elements are substantially in the form of a strip. The heating elements may be encased with a material forming the weld bar or bars. The heating elements may be overmoulded with the material which forms the weld bar or bars. The heating elements may contact an outer surface of the bar assembly, preferably the weld bar or bars.

Preferably, the weld bar or bars include the heating elements. The heating elements may be located in holes extending through the weld bar or bars. The heating elements may be encased or surrounded in an electrically insulative material. The heating elements may be located at or near the contact surfaces. Preferably, the heating elements are located between the surface of the bar assembly and the non-stick material. Preferably, the heating elements are strips on the surface of the bar assembly.

The heating elements may be embedded into the main body of the weld bar or bars or into the non-stick coating. Preferably, the heating elements are laid over the main body of the weld bar or bars such that the heating elements can slide along the surface of the main body of the weld bar or bars. Preferably, separate heating elements are laid for each of the contact surfaces.

Each heating element may be of variable width. Preferably, the heating elements are between about 5 to 20 mm wide. More, preferably the heating element is between about 8 to 16 mm wide. Most preferably, about 10 mm wide. The first and second heating elements may be the same width or different. For example, the first top and bottom heating elements may be 10 mm wide, and the second top and bottom heating elements may be 20 mm wide. The width of the top bar assembly and bottom bar assembly may be adjusted to accommodate the width of the first and second heating elements.

The heating device is adapted to selectively heat the first heating elements and/or the second heating elements. Preferably, electricity running through the first and second heating elements in the top bar assembly and bottom bar assembly can be controlled separately. Preferably, the heating device selectively heats the first heating elements, ie the first top and bottom heating elements, and the second heating elements, ie the second top and second bottom heating elements.

It will be appreciated that either the first top and bottom heating elements may be heated or the second top and bottom heating elements may be heated or all heating elements heated.

This allows a selectable control of the weld width of the material. To illustrate, if all heating elements are each 10 mm wide, when the first top and bottom heating elements are heated, the weld width will be 10 mm and when all heating elements are heated, the weld width will be 20 mm. Thus the weld with may be adjusted based on the heating element width and selectively controlling the heating and/or cooling of those elements.

Preferably, the heating device further includes at least one tensioning mechanism attached to each end of the heating elements. The tensioning mechanism may include hydraulic or pneumatic pistons, electric motors, springs or other devices to add tension to the heating elements. Preferably, the tensioning mechanism includes pneumatic pistons attached to each end of the heating elements. Preferably, the tensioning mechanism is adapted to apply tension to each of the heating elements when the heating elements have current running through them.

The voltage running through the heating elements may be any voltage. Preferably, the voltage running through the heating elements is between 20 Volts (V) and 100V. Most preferably, the voltage running through the heating elements is between 40V and 60V. The current running through the heating elements may be any current. The current running through the heating elements may be between 10 Amps (A) and 150 A. Preferably, the current running through the heating elements is between 50 A and 70 A.

The heating device may include switches, relays, drivers, controllers, display and control panels and other electronic devices. The heating device may include at least one temperature measuring device. At least one temperature measuring device may include at least one thermocouple, negative temperature coefficient thermistor, resistance temperature detector, semiconductor-based sensor, infrared/thermal camera or other temperature measuring devices. The temperature measuring devices may be located in, on or near the bars. Multiple temperature measuring devices may be located along the length of the bars.

The heating device may include a feedback system, such that the heating device/controller adjusts the heating of the heating elements in response to the temperature received by the temperature sensors. The heating device may be adapted to selectively heat the elements during and not during the welding process or between welding processes.

Actuator Device

The actuator device may be adapted to move the bottom bar assembly towards the top bar assembly. Preferably, the actuator device is adapted to move the top bar assembly towards the bottom bar assembly. The actuator device may be attached to the bottom bar assembly, preferably the bottom bar supports. The actuator device may be attached to the top bar assembly, preferably the top bar supports. Preferably, the actuator device is also attached to the support structure. Preferably, the actuator device is attached to a beam extending between two plates of the support structure. The actuator device may include solenoids, electric rotary motors, stepper motors, hydraulics and hydraulic pistons, pneumatics and pneumatic pistons, and/or compressed air motors. Preferably, the actuator device includes pneumatic pistons. Preferably, the actuator device further includes a pneumatic pump and pneumatic pipes between the pneumatic pump and the pneumatic pistons. Preferably, the actuator device further includes valves. Preferably, a first end of the pneumatic pistons is attached to the beams of the support structure and a second end of the pneumatic pistons is attached to the top bar supports. The actuator device may include multiple pneumatic pistons. Preferably, the actuator device includes between 5 and 20 pneumatic pistons. The actuator device may include between 0.5 and 2 pneumatic pistons per meter of the length of each the top bar assembly and bottom bar assembly. Preferably, the actuator device includes between 1 and 1.5 pneumatic pistons per meter of the length of each of the top bar assembly and bottom bar assembly. Preferably, the join between the top bar supports of the assembly and the pneumatic pistons may include a pivot join. The pivot join may include an axis which is perpendicular to a longitudinal axis of the bars. Preferably, the pneumatic pistons can apply a force compressing the material between the top bar assembly and bottom bar assembly.

Welding Process

Preferably, the welding process includes inserting the at least two portions of the material between the top bar assembly and the bottom bar assembly, the at least two portions of the material overlapping each other, heating the first heating element of the first top bar assembly and first heating element of the bottom bar assembly, the second heating element of the top bar assembly and the second heating element of the bottom bar assembly or the first and second heating elements of the top bar assembly and the first and second heating element of the bottom bar assembly, then activating the actuator device to raise the bottom bar assembly and/or lower the top bar assembly until the contact surfaces contact and/or apply force to the material, then raising the top bar assembly and/or lowering the bottom bar assembly.

The heating device may be switchable to selectively heat each of the heating elements. Preferably, the heating device is adapted to be switchable to heat either the first top and first bottom heating element or all the heating elements. The heating device may heat the heating elements until they reach a certain temperature or for a first time period before actuating the actuator device to press the assembly onto the material in the welding process. As the heating elements are heating, a cooling device (if present) may cool the heating elements which are not being heated. Therefore, the heating elements not being heated may not inadvertently also weld the material.

Selectively heating the heating elements means that the width of the weld that is formed during the welding process can be adjusted. For example, if the heating elements are each 10 mm wide, when the first top and bottom heating elements are heated, the weld width will be 10 mm and when all heating elements are heated, the weld width will be 20 mm. Thus the weld with may be adjusted based on the heating element width and selectively controlling the heating of those elements.

Preferably, the top bar assembly is lowered using the actuator device until the contact surfaces of the top bar assembly and bottom bar assembly press onto or contact the material in between. During the welding process, the actuator device may press or contact the contact surfaces of the top bar assembly and bottom bar assembly onto the material for a time period. Preferably, then the top bar assembly is raised off the material. Preferably, this completes the welding process. The first and second time period (time periods) may be pre-set. The time periods may be variable. The first time period may depend on the temperature measured from the at least one temperature measuring device.

The welding process may be repeated multiple times on the same at least two portions of material. The welding process may include the use of an infrared/thermal camera to measure a surface temperature of the at least two portions of the material. The surface temperature of the at least two portions may be used to verify that the at least two portions of material are adequately bonded together. Depending on if the surface temperature of the at least two portions is above or below a certain temperature, a controller may repeat the welding process or adjust the certain temperature of the bars for the next welding process.

Cooling Device

The cooling device may include multiple cooling devices. The cooling device may include an air or fluid circulation system with air or a fluid circulating through at least one hole in the top bar assembly or bottom bar assembly and a cooling system. Preferably, the cooling device includes the air or fluid circulation system with the air or fluid circulating through two holes in each of the bars. The cooling device/cooling system may include a reverse cycle cooling device. The reverse cycle cooling device may include at least one compressor, expansion valve and radiator adapted to selectively cool the bars. Preferably, the cooling device includes at least one Peltier device (thermoelectric device). The Peltier device may contact the top and/or bottom bar assembly or be built into the top and/or bottom bar assembly. The Peltier device may be located along the length of the top bar assembly and/or bottom bar assembly. Preferably, the at least one Peltier device cools the air or fluid circulating through the at least one hole in each of the top bar assembly and/or bottom bar assembly. The cooling device may include at least one radiator.

The cooling device may include temperature sensors. The temperature sensors may include the temperature sensors described above for the heating device.

The cooling device may include a feedback system, such that the cooling device/controller adjusts the cooling of the heating elements in response to the temperature received by the temperature sensors. The cooling device may be adapted to selectively cool each of the heating elements during or not during the welding process or in between welding processes.

Preferably, the cooling device is adapted to cool the heating elements when the heating device is not heating. Preferably, the cooling device is adapted to cool the heating elements during one cycle of a welding process or in between two or multiple cycles of a welding processes.

Controller

The material welder may further include at least one controller (which may include the controller). The controller may be an electronic controller. One controller may control both the heating device and cooling device. The heating device, cooling device and actuator device may each be individually controlled by their own controller. The controller may be adapted to selectively allow electricity to run through each of the heating elements. The controller may be adapted to control the heating device to individually heat each of the heating elements. The controller may be adapted to control the heating device to heat either all the heating elements or the first top and bottom heating elements or the second top and bottom heating elements. The controller may be adapted to control the cooling device to individually cool each of the heating elements. The controller may be adapted to control the cooling device to cool either none of the heating elements or the first top and bottom heating elements or the second top and bottom heating elements. The controller may include an interface to set the first and second time periods, the force that the actuator device has to press the contact surfaces of the top bar assembly and/or bottom bar assembly onto the material and other settings for the welding process. The controller may automatically control the material welder during the welding process such that the only input required is to start the welding process. The controller may be manually operated with such that inputs are required from an operator during the welding process. The controller may include a central processing unit (CPU).

The controller may include a display, touch screen, buttons, switches, relays, wires and wireless communications module. The wireless communications module may be adapted to connect to the internet through the global system for mobile (GSM) or through wi-fi.

Tables

The material welder may further include at least one table, nominated tables. A top surface of at least one of the tables may be positioned lower than the contact surface of the bottom bar assembly. The top surface of at least one of the tables may be positioned higher than the contact surface of the bottom bar assembly. Preferably, the top surface of at least one of the tables is positioned substantially level with the contact surfaces of the bottom bar assembly. Most preferably, the top surface of all the tables are substantially in the same plane as the contact surfaces of the bottom bar assembly. A length of the tables may be equal to the length of the top bar assembly and bottom bar assembly (assemblies) The length of the tables may be shorter than the length of the assemblies. Preferably, the length of the tables is longer than the length of the assemblies. Preferably, the tables extend past the length of the assemblies. Each of the tables may be made of a single piece. Preferably, each of the tables include multiple pieces forming the top surface of the tables. Preferably, the multiple pieces abut each other. The tables may only include a table on one side of the assemblies. Preferably, the tables include a first table on a first side of the assemblies and a second table on a second side of the assemblies. The first and second tables may abut against the bottom bar assembly. The first and second tables may be any distance from the bottom bar assembly. The first and second tables may be a short distance from the bottom bar assembly. The short distance may be less than 100 mm. The short distance may be less than 10 mm. Preferably, the short distance is less than 5 mm. Most preferably, the short distance is between 0.5 mm and 2 mm. The first and second tables may include any width. The first and second tables may have a width between 100 mm and 1000 mm. Preferably, the first and second tables have a width between 300 mm and 500 mm. The tables may include channels, holes, cut outs or other features. At least one of the tables may include hinges which allow the tables to pivot about the hinges. Preferably, the first table and the second table each include a channel. Transverse cross-sections of the channels may include square, triangular, rectangular, trapezoidal or other shapes. Preferably, transverse cross-sections of the channels are in the shape of a trapezium. Preferably, the channels have the same transverse cross-section along a length of the channels. Preferably, the channels extend the whole length of the tables. Preferably, the tables include a sheet holding device. The sheet holding device may include at least one slot, clamp, hook or other device adapted to temporarily secure the sheet in a position. Preferably, the sheet holding device includes a clamp. Preferably, the clamp includes at least one upper member and at least one lower member. Preferably, the upper and/or lower member is adapted to move to clamp a portion of the material. Preferably, the clamp is adapted such that the material can be clamped between the upper member and the lower member. Preferably, the clamp is adapted such that a bead of the material can be clamped between the upper member and the lower member. Preferably, the bead is a portion of the material along at least one edge of the material which is thicker than a main portion of the material. Preferably, the main portion of the material makes up at least 90% of the materials volume. Preferably, the main portion of the material includes the centre portion of the material.

The first and second tables may be different. Preferably, the tables are identical. Preferably, the tables are orientated such that the first and second tables are symmetrical either side of the bottom bars. The tables may include vertically aligned portions, beams and other supports. Preferably, the tables include a solid sheet with bends. Preferably, the solid sheet has substantially the same transverse cross-section along its length. Preferably the solid sheet includes bends resulting in features including vertically aligned panels on an outer side of the tables. Preferably, the bottom bars are located next to an inner side of the tables. Preferably, the tables further include beams aligned across the length of the tables. The beams may include beams with transverse cross sections in the shape of an I, U, T or other shapes. Preferably, the beams include extruded beams, such as aluminium extrusions.

The tables may include fixing devices such as bolts, screws, interlocking features and other devices.

Support Structure

The material welder may further include a support structure. The support structure may include beams, support plates, fixing devices and other features. Preferably, the support structure includes hollow rectangular beams spanning between end support plates. Preferably, the end support plates are mounted directly or indirectly onto a substrate. Preferably, the tables are mounted to the support structure.

In this specification, the term 'comprises' and its variants are not intended to exclude the presence of other integers, components or steps.

In this specification, reference to any prior art in the specification is not and should not be taken as an acknowledgement or any form of suggestion that this prior art forms part of the common general knowledge in Australia or any other jurisdiction or that this prior art could reasonably expected to be combined by a person skilled in the art.

For the purpose of example, numerous specific details are set forth in the following description in order to provide a thorough understanding of the present invention. The present invention may be practiced according to the claims without some or all of these specific details. For the purposes of clarity, technical material that is known in the technical fields related to the invention has not been described in detail so that the present invention is not unnecessarily obscured.

The present invention will now be more fully described with reference to the accompanying examples and drawings. It should be understood, however, that the description following is illustrative only and should not be taken in any way as a restriction on the generality of the invention described above.

BRIEF DESCRIPTION OF THE SEVERAL VIEWS OF THE DRAWINGS

The invention may be better understood from the following non-limiting description of preferred embodiments, in which:

FIGS. 10 and 11 are, respectively, right cross-sectional views of the top bar assembly and bottom bar assembly with weld bar as shown in FIG. 9.

DESCRIPTION OF SPECIFIC EMBODIMENTS OF THE INVENTION

Preferred features of the present invention will now be described with particular reference to the accompanying drawings. However, it is to be understood that the features illustrated in and described with reference to the drawings are not to be construed as limiting on the scope of the invention. In describing the various embodiments of the invention, like features will/may be referred to using like references, with references for features of each embodiment generally preceded by 1, 2, 3, or followed by a Roman numeric sequence, such as i, ii, iii, etc. or an alphabetical sequence such as a, b, c, relative to the corresponding feature of the first embodiment. For example, a feature 10 of the first embodiment may represented as 110, 210, 310, or 10a, 10b, 10c, or 10i, 10ii, 10iii, etc. in second, third and fourth embodiments, respectively.

A material welder 1 adapted to weld at least two portions of a material together. The material being made of materials including plastic, such as nylon and polyester.

Figure 1:
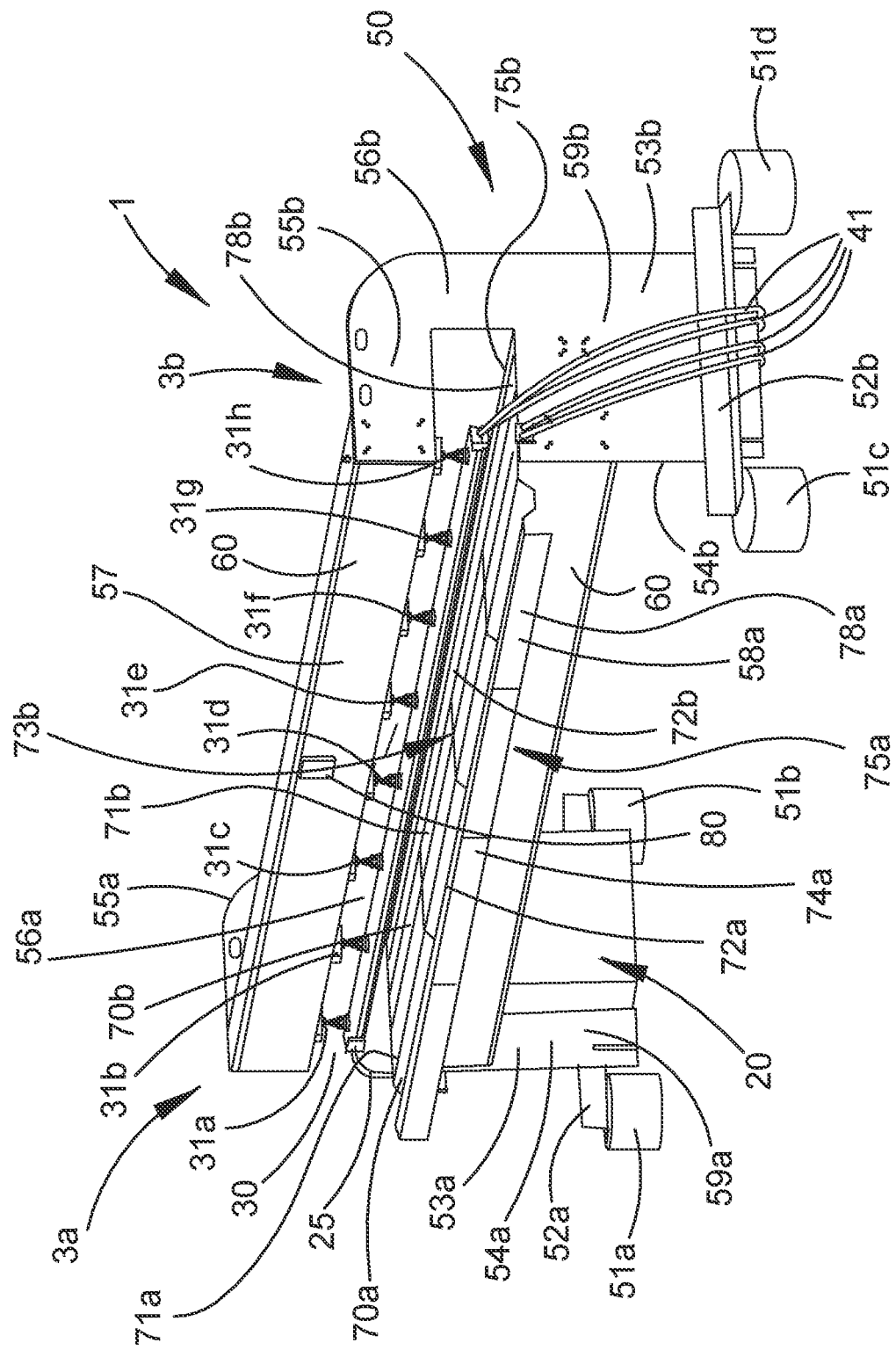
FIG. 1 is an upper perspective view of a material welder.
Figure 2:
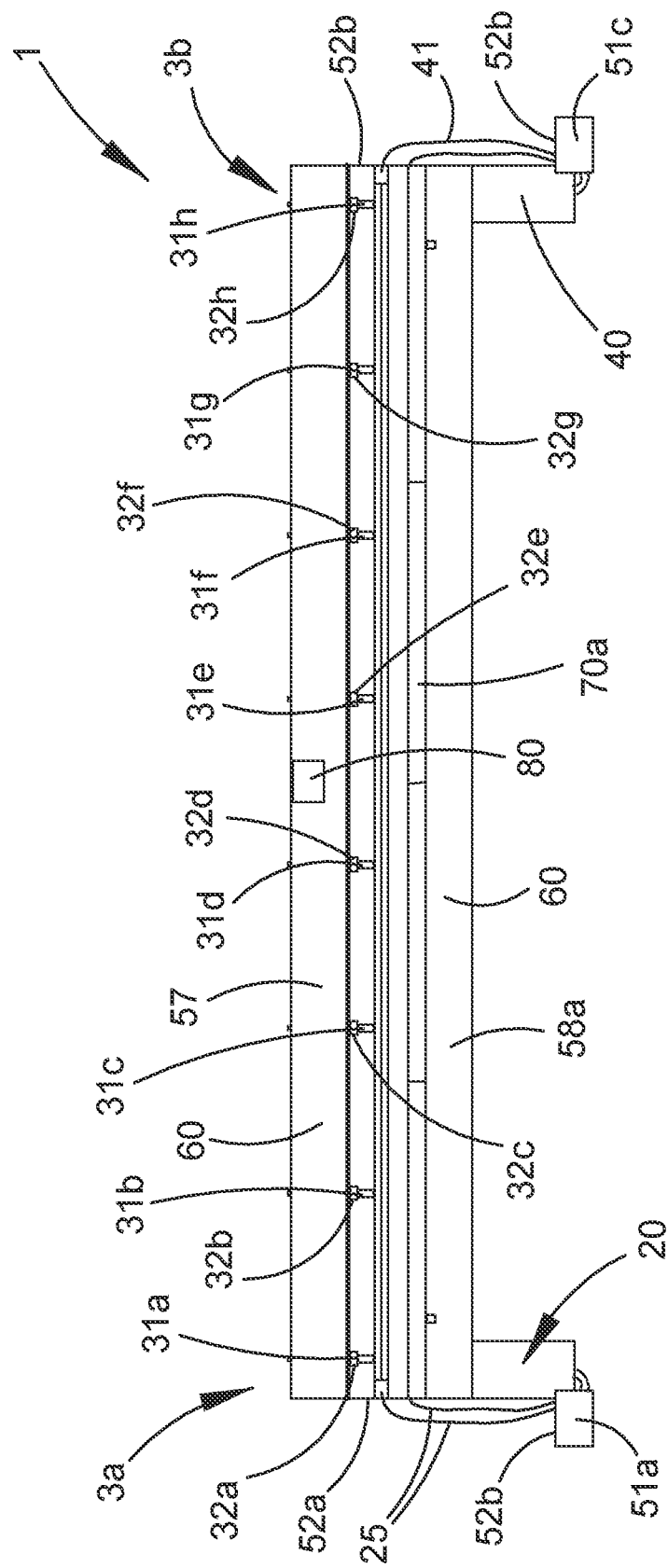
FIG. 2 is a front view of the material welder shown in FIG. 1.
Figure 3:
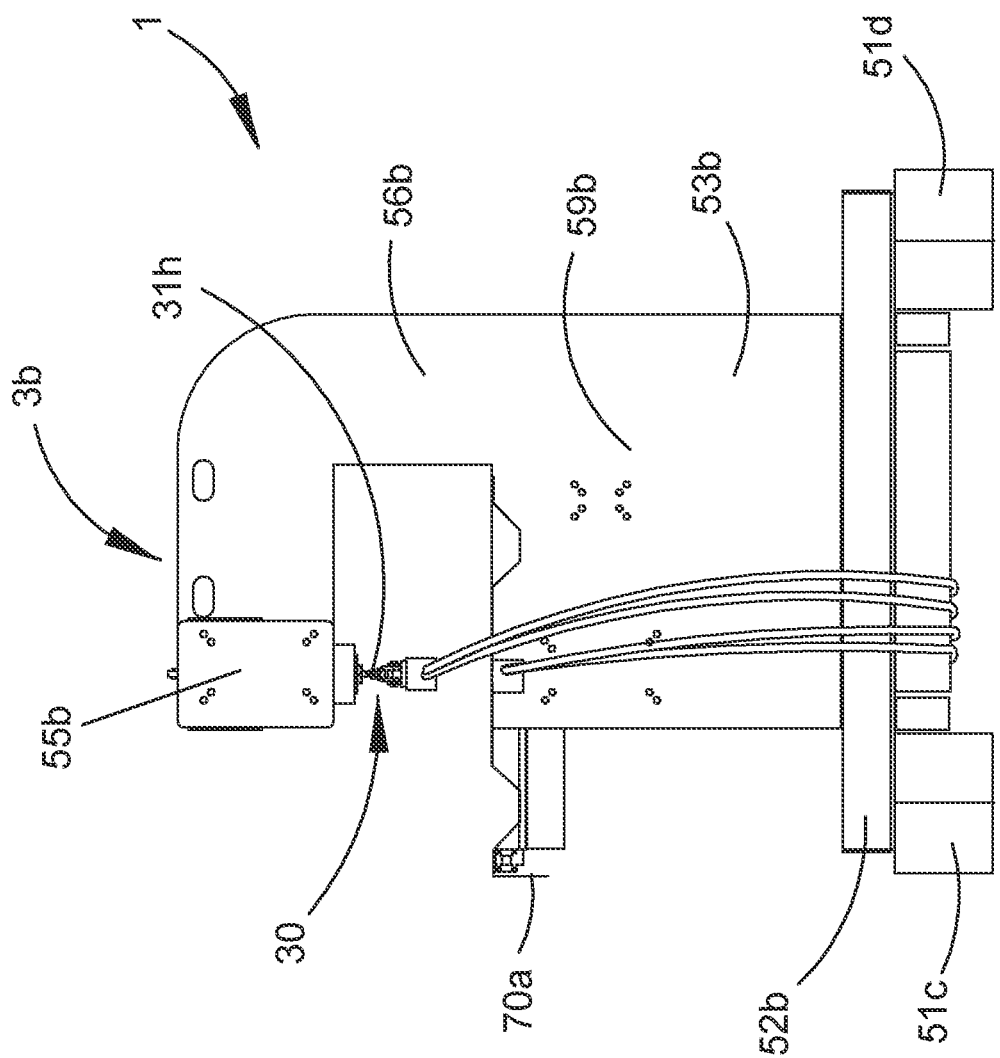
FIG. 3 is a right view of the material welder shown in FIG. 1.
Figure 4:
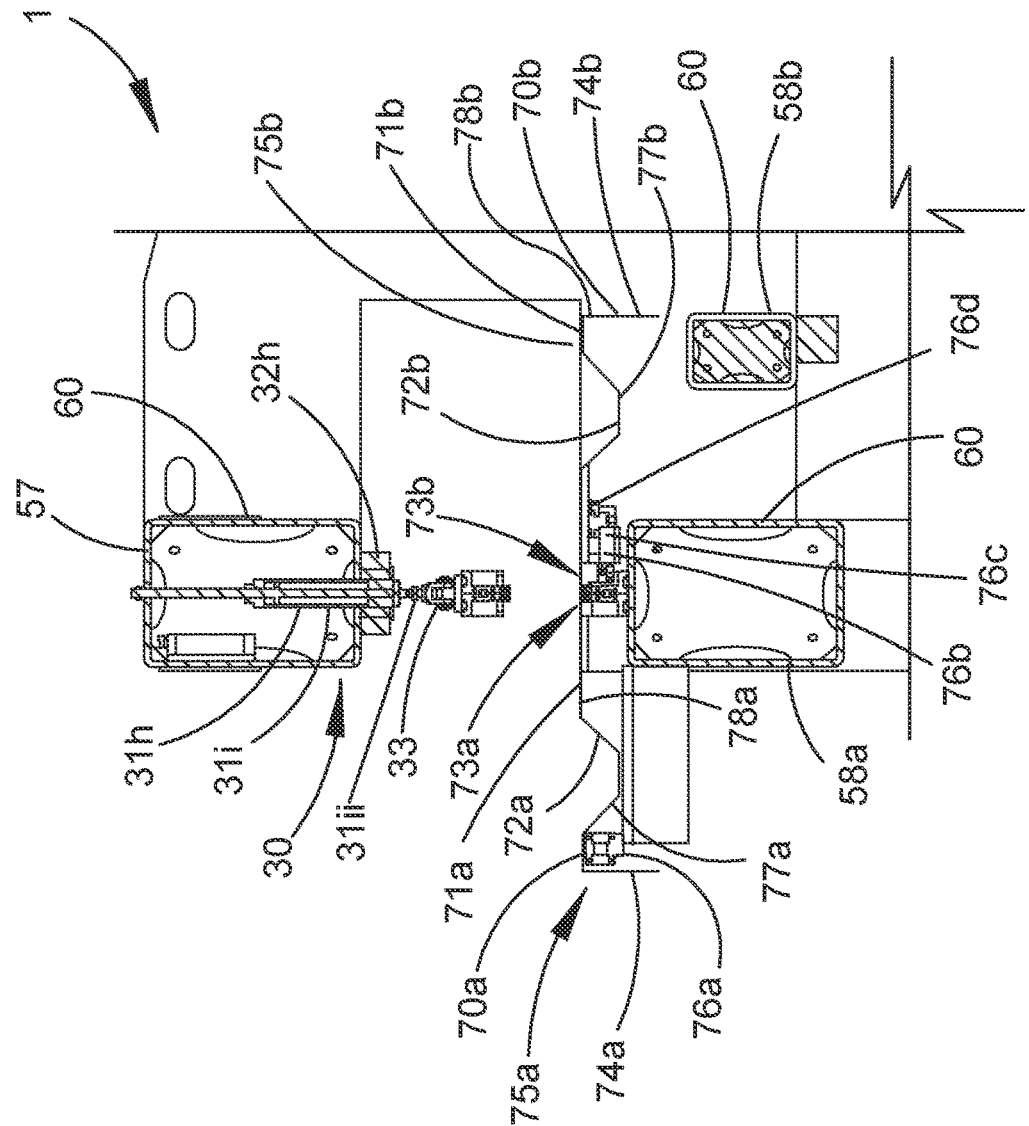
FIG. 4 is a right cross-sectional view of the material welder shown in FIG. 1.
Figure 5:
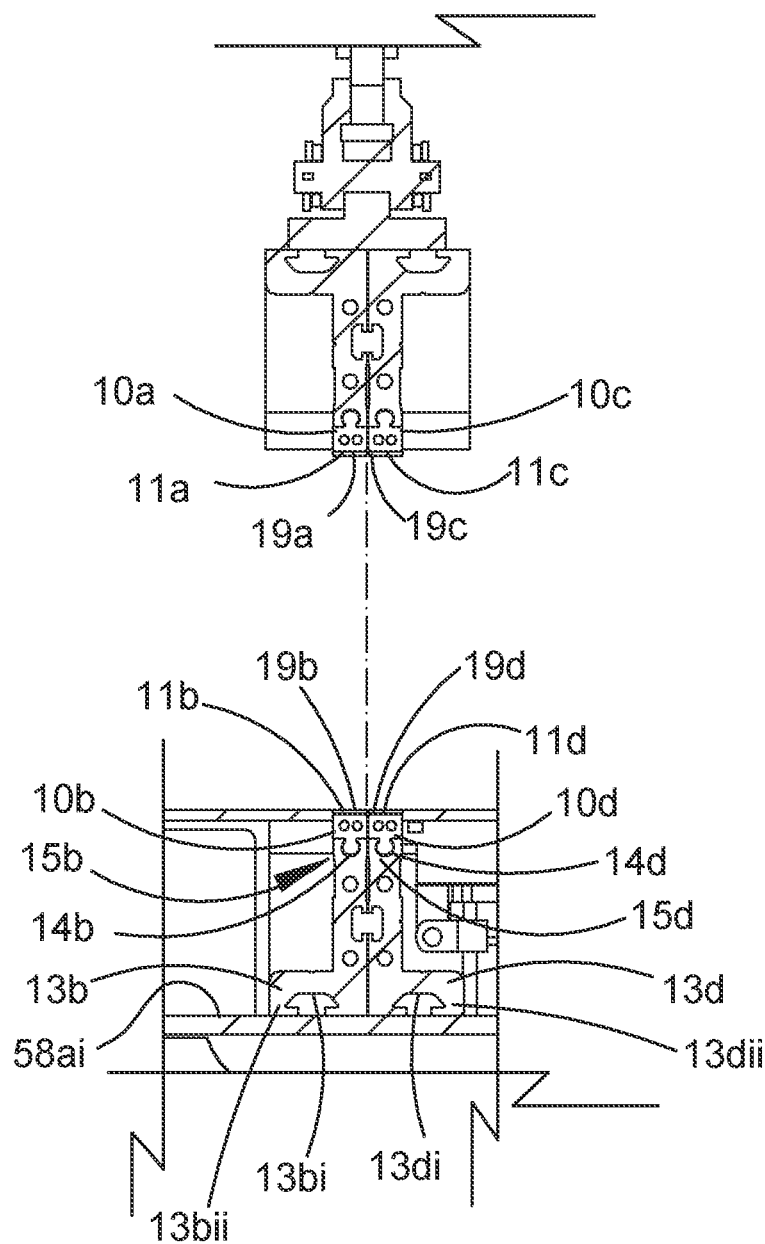
FIG. 5 is a right cross-sectional view of the material welder shown in FIG. 1 showing the top bar assembly directly above the bottom bar assembly indicated by the dashed line.
Figure 6:
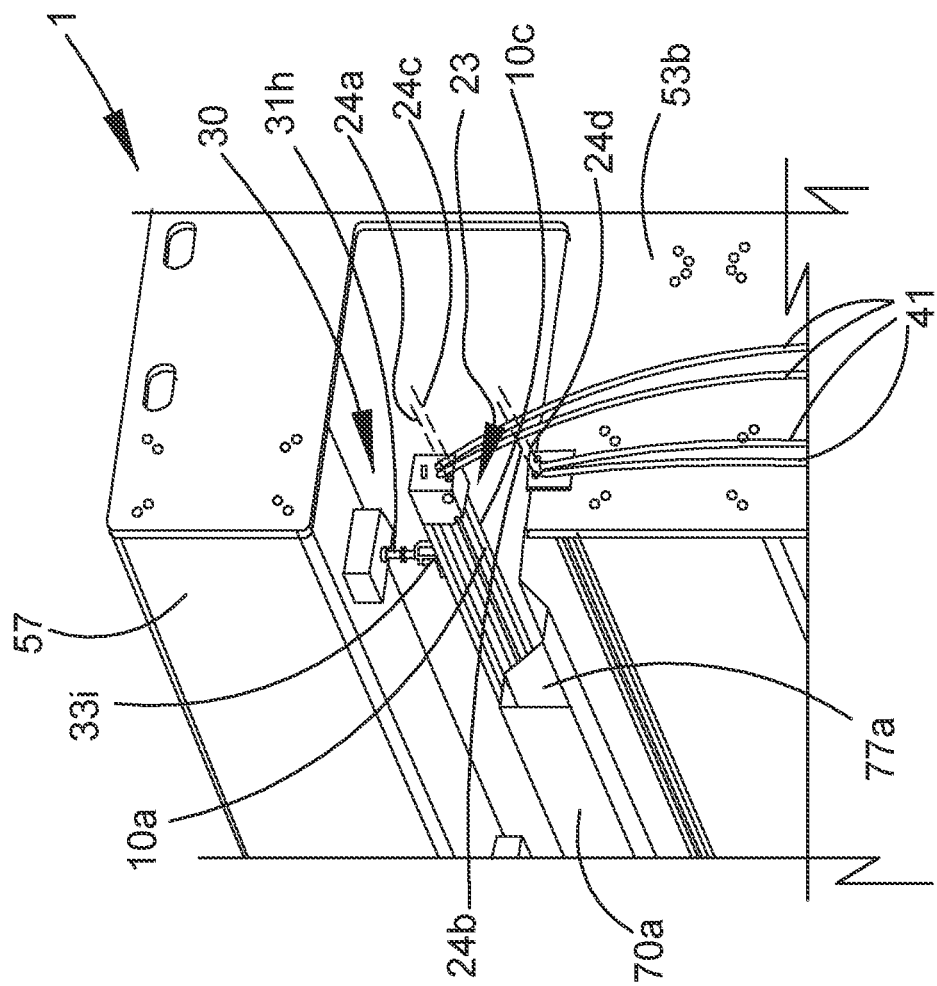
FIG. 6 is a lower perspective view of a first end of the material welder shown in FIG. 1.
Figure 7:
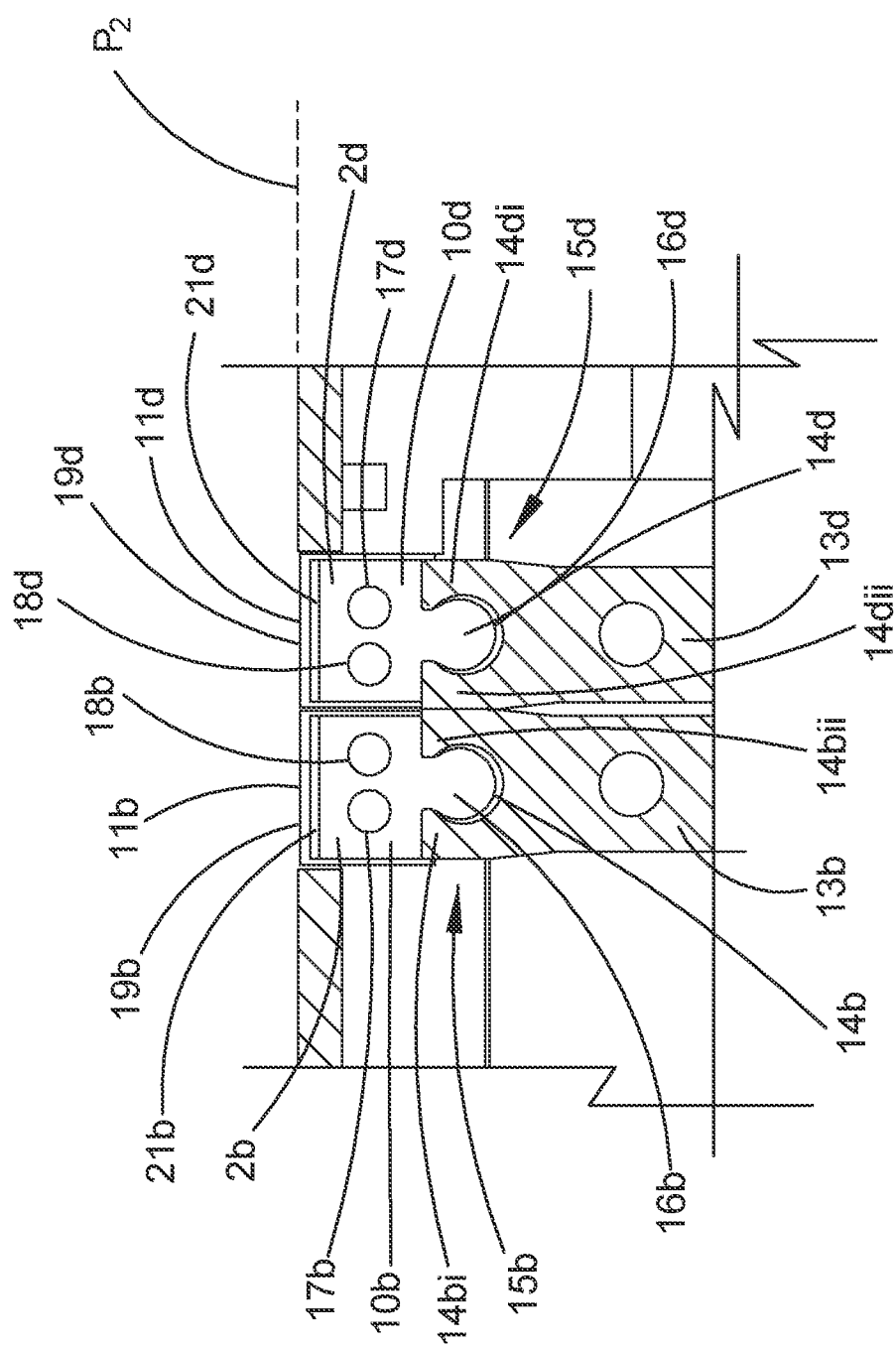
FIGS. 7 and 8 are, respectively, right cross-sectional views of the top bar assembly and bottom bar assembly shown in FIG. 5.
Figure 8:
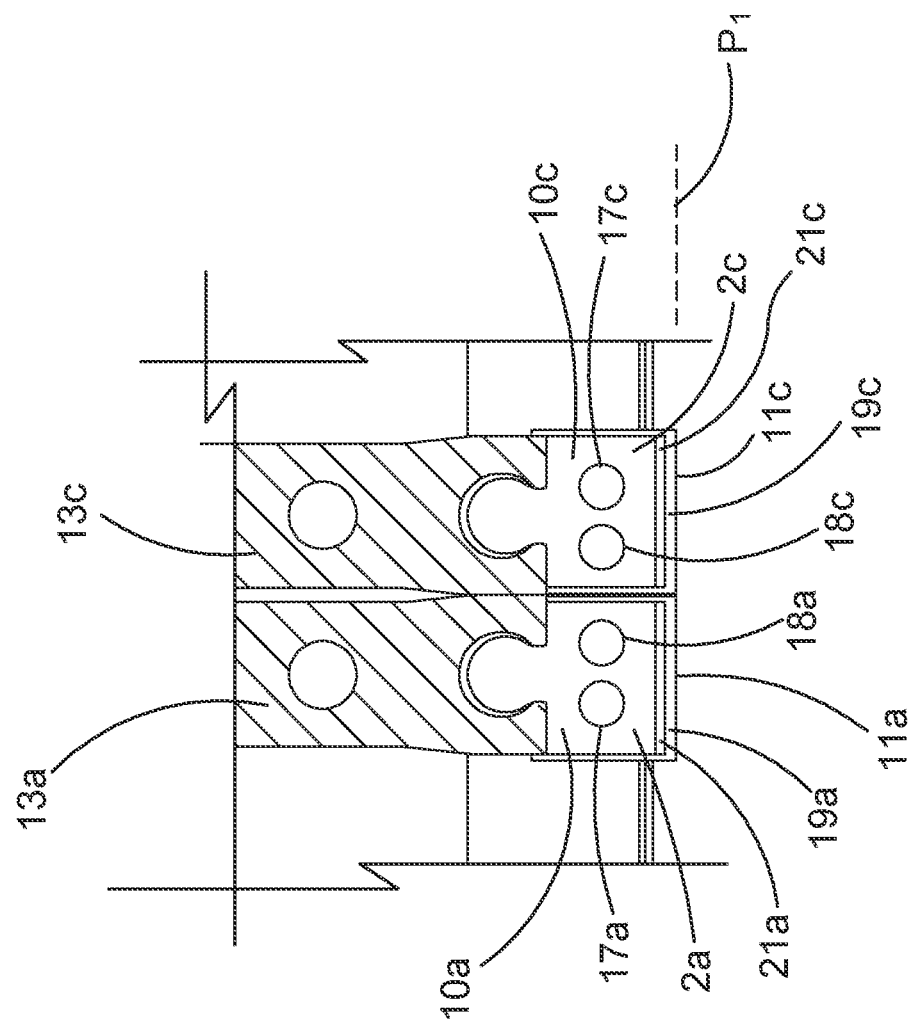
Figure 9:
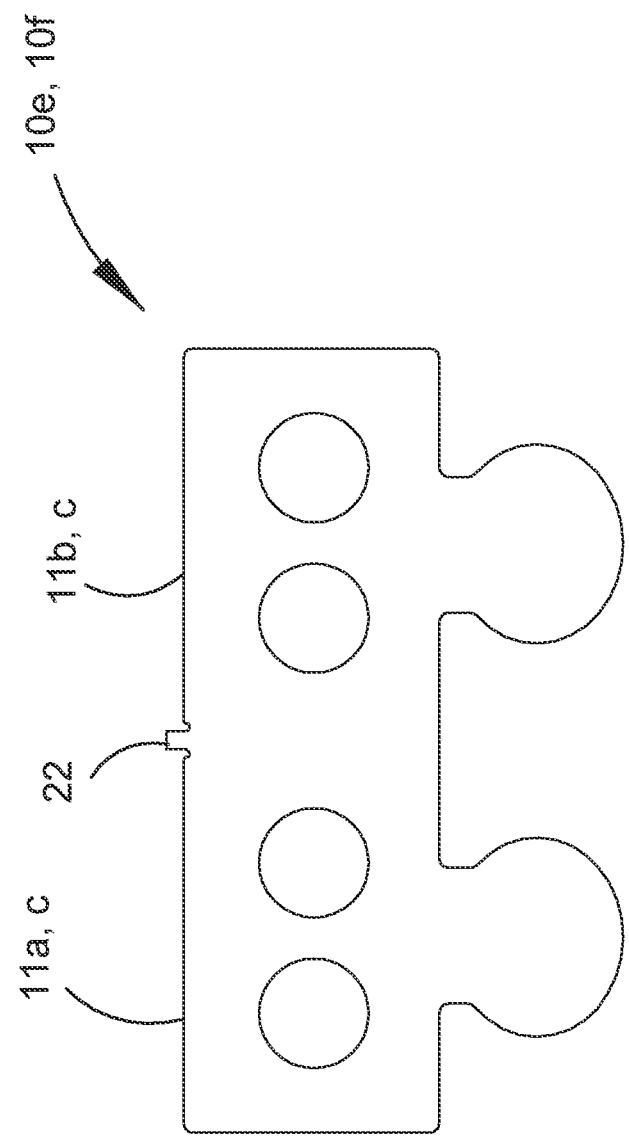
FIG. 9 is a cross sectional view of a single weld bar of the top and/or bottom bar assembly.
Figure 10:
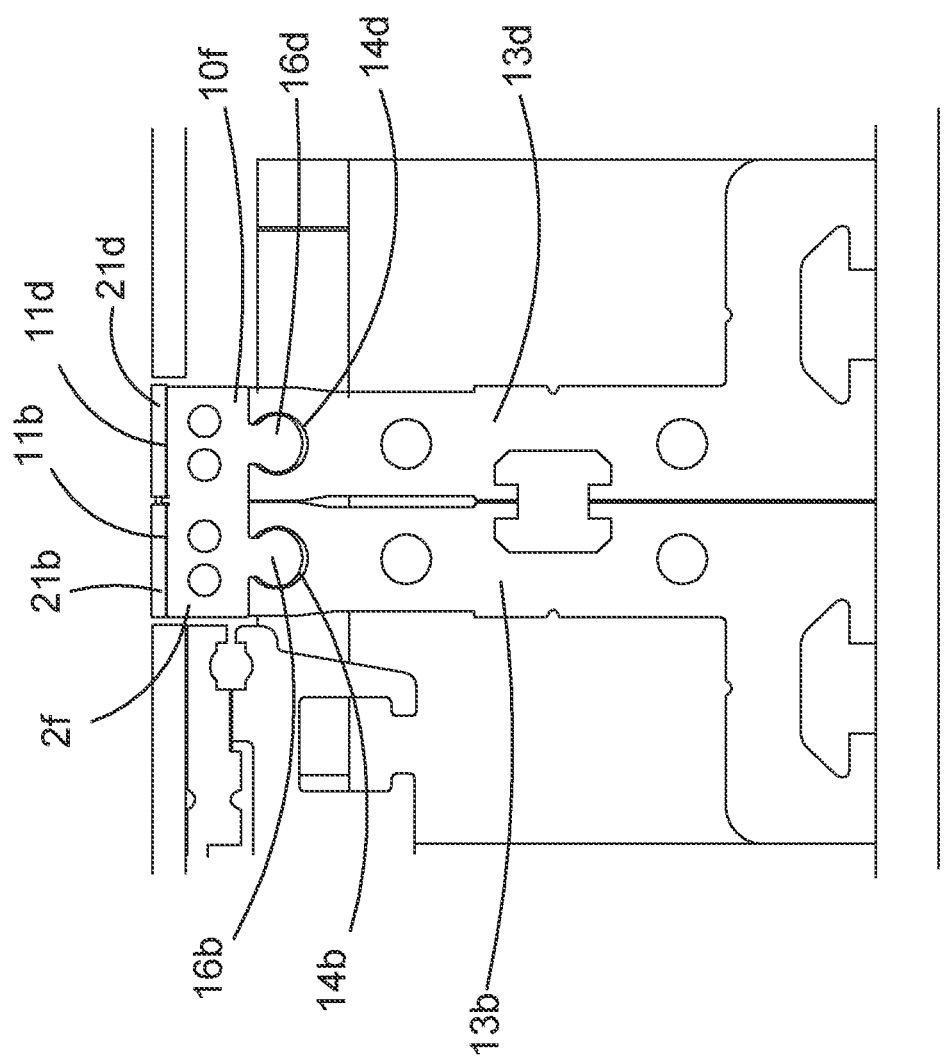

Referring to FIGS. 1 to 4, there is shown a material welder 1. FIGS. 5 to 8 shown one arrangement of the top and bottom bar assembly having two parallel weld bars according to one embodiment of the invention. FIGS. 9 to 11 shown an alternative arrangement of the top and bottom bar assembly, having a single weld bar according to another embodiment of the invention. As described below, it will be appreciated that either arrangement of the top and bottom bar assembly each having a first and second heating element are suitable.

In one embodiment, the material welder 1 includes a top bar assembly including a first weld bar 10a and a bottom bar assembly including a first weld bar 10b. A portion of the first weld bar 10a is positioned directly above a portion of the first bottom weld bar 10b. The material welder 1 includes at least one heating device 20 adapted to selectively heat the heating element of the first top and first bottom weld bars 10a-b. The first top and/or first bottom weld bars 10a-b includes an actuator device 30 adapted to move the first top bar assembly and/or first bottom bar assembly including weld bars 10a-b towards the other of the first top or first bottom weld bars 10a-b. Contact surfaces 11a-b of the top bar assembly and bottom bar assembly are adapted to contact the material during a welding process.

The material welder 1 according to this embodiment further includes a second top weld bar 10c and a second bottom weld bar 10d. The second top weld bar 10c is located beside the first top weld bar 10a and a contact surface 11c of the second top weld bar 10c is substantially in a same plane $P_1$ as the contact surface 11a of the first top weld bar 10a. The second bottom weld bar 10d is beside the first bottom weld bar 10b and a contact surface 11d of the second bottom weld bar 10d is substantially in the same plane $P_2$ as the contact surface 11b of the first bottom weld bar 10b. The contact surface 11c-d of the second top and second bottom weld bar 10c-d is adapted to contact the material during a welding process. A portion of the second top weld bar 10c is directly above a portion of the second bottom weld bar 10d. The actuator device 30 is adapted to move the first and second top weld bars 10a, 10c together towards the first and second bottom weld bars 10b, 10d and/or the first and second bottom weld bars—10b, 10d together towards the first and second top weld bars 10a, 10c. The heating device 20 is adapted to selectively heat the heating elements of the second top and second bottom bars 10b, 10d.

The material welder 1 may further include at least one cooling device 40 adapted to, in between multiple welding processes or during a welding process, selectively cool the heating elements located in either the first top and first bottom weld bar 10a, 10b or the heating elements located in the second top and second bottom weld bar 10c, 10d, cool the heating elements in the first and second top bar 10a, 10c and the second top and second contact surfaces of the bottom bar 11b, 11d or not to cool any of the first and second contact surfaces of the top bars 10a, 10c and first and second contact surfaces of the bottom bars 11b, 11d.

With further regard to the material welder 1 described above, the welding process includes inserting the at least two portions or edges of respective pieces of material between the top bar assembly and bottom bar assembly, each portion of the at least two portions of the material overlapping each other. The welding process also includes heating the heating element of the first top weld bar 10a and the heating element of the first bottom weld bar 10b as a default, for the welding of thin strips (for example between about 5-15 mm wide, or about 10 mm wide). The material welder advantageously may involve the additional heating of the second heating element of the top weld bar 10c and the heating element of the second bottom bar 10d, so that all heating elements are heated, whereby to provide a weld width that is between about 10-30 mm wide, or preferably about 20 mm wide. By this means, a single material welder 1 is capable of effecting a variety of weld widths. Of course, the material welder may include a third and subsequent opposed pairs of welding bars 10x (bars) on the assembly, to provide capacity for further variable width welds.

Accordingly, the first and second top weld bars 10a,c and the first and second bottom weld bars 10b,d, may be physically raised or lowered relative to each other, irrespective of whether the heating element(s) of one (10a,b) or both (10a-d) pairs are heated.

The activation of the actuator device 30 may be used to raise the bottom bar assembly including the first and second bottom weld bar s 10b,d and/or lower the top bar assembly including the first and second top weld bars 10a,c, until the contact surfaces 11a-d contact and/or apply force to the overlapping pieces of material until the weld operation is completed, after which the top bar assembly including the first and second top bars 10a, c are raised and/or the bottom bar assembly including the first and second bottom bars 10b,d are lowered. In the material welder shown, only the top bar assembly including the first and second top weld bars 10a,c are raised or lowered by the actuator device 30, whereas the bottom bar assembly including the first and second lower weld bars 10b,d remain statically at the table.

The material welder 1 includes a support structure 50. The support structure 50 includes 4 concrete pillars 51a-d, 2 concrete pillars 51a-b at a first end 3a of the material welder 1 and 2 concrete pillars 51c-d at a second end 3b of the material welder 1. A first base plate 52a is mounted to the 2 concrete pillars at the first end 3a and a second base plate 52b is mounted to the 2 concrete pillars at the second end 3b. A first end plate 53a is mounted to the first base plate 52a and a second end plate 53b is mounted to the second base plate 52b. Large faces 54a-b of the first and second end plates 53a-b are parallel with each other and face each other. The first and second end plates 53a-b are identical. The first and second end plates 53a-b are substantially in the shape of a C. The first and second end plates 53a-b may also include holes, cut outs and radius edges. The first and second end plates 53a-b include an upper arm 55a-b and a base 59a-b connected with a vertical arm 56a-b therefore forming the C shape. A first hollow rectangular beam 57 is attached to and extends between the upper arm 55a of the first end plate 53a and the upper arm 55b of the second end plate 53b. The first hollow rectangular beam has a vertical width of 300 mm and a horizontal width of the 200 mm. The support structure 50 further includes a second and third hollow rectangular beam 58a-b which are attached to and extend between the base 59a of the first end plate 53a and the base 59b of the second end plate 53b. The first, second and third hollow rectangular beams 57, 58a-b are orientated such that a wider face 60 of the first, second and third hollow rectangular beams 57, 58a-b is aligned vertically.

Whilst the support structure of the material welder is shown with concrete pillars at its feet, it will be appreciated that the support structure may alternatively include other types of feet, including legs with adjustable height, wheels, including lockable wheels. Any feet that is suitable to hold the weight of the material welder is contemplated.

The material welder 1 further includes a first and second table 70a-b (tables). The first and second tables 70a-b are identical. The tables 70a-b may include at least one upper surface 71a-b which is substantially in the same plane as the contact surfaces 11b, 11d of the bottom bar assembly. Preferably, the tables 70a-b each include two upper surfaces 71a-b. The tables 70a-b each further include a channel 72a-b. The channels 72a-b are in the shape of a trapezium. The channels 72a-b are located between the two upper surfaces 71a-b in each of the tables 70a-b. Inner sides 73a-b of the tables 70a-b may abut or be located within 10 mm of the bottom bar assembly. Preferably, the inner sides 73a-b of the tables 70a-b are located 1 mm from the bottom bar assembly. The tables 70a-b further include vertical panels 74a-b on outer sides 75a-b of the tables 70a-b. The two upper surfaces 71a of the first table 70a, the channel 72a and the vertical panel 74a are all made of four pieces of bent plate 78a. The two upper surfaces 71b of the second table 70b, the channel 72b and the vertical panel 74b are all made of four pieces of bent plate 78b. The first table 70a is on an operator's side 75a (one of the outer sides) of the material welder 1. The material welder 1 is adapted such that it is preferable for the operator to stand on the operator's side 75a of the material welder 1. The first table 70a includes a first extruded beam 76a attached to an underside 77a of the bent plate 78a of the first table 70a and on the outer side 75a of the first table 70a. The first extruded beam 76a may provide additional structural support to the first table 70a. At least one hinge may be mounted to the first extruded beam 76a and the first table 70a may be able to move/pivot about the hinge. The hinge may be attached to a beam mounted to the second hollow rectangular beam 58a. The second table 70b includes a second, third and fourth extruded beam 76b-d mounted to an underside 77b of the bent plate 78b of the second table 70b. The second, third and fourth extruded beams 76b-d may provide additional structural support to the second table 70b.

The material welder 1 further includes a first and second bottom bar supports 13b, 13d (bottom bar supports). The bottom bar supports 13b, 13d are identical. The bottom bar supports 13b, 13d are attached to a top surface 58ai of the second hollow rectangular beam 58a. The bottom bar supports 13b, 13d are substantially in the form of an elongate beam with and L-shaped transverse cross-section. Substantially in that the bottom bar supports 13b, 13d also includes channels, holes and radiused edges. The bottom bar supports 13b, 13d abut each other. The bottom bar supports 13b, 13d each include bolt head shaped channels 13bi, 13di on a base 13bii, 13dii of the bottom bar supports 13b, 13d and along their length to receive bolts for attachment to the second hollow rectangular beam 58a. The bottom bar supports 13b, 13d each further include an interlocking channel 14b, 14d on an upper end 15b, 15d of the bottom bar supports 13b, 13d which extend the length of the bar supports 13b, 13d. The upper end 15b, 15d of the bottom bar supports 13b, 13d including two claws 14bi-bii, 14di-dii forming a C-shape which define the interlocking channels 14b, 14d. The bottom bar supports 13b, 13d are made of an aluminium alloy.

The interlocking channels 14b, 14d receive the weld bar 10e or weld bars each include interlocking features 16b, 16d which are in the form of cylinders. The interlocking features 16b, 16d are adapted to slide into the interlocking channels 14b, 14d locking together the bottom bar supports 13b, 13d and the bottom weld bar 10f or weld bars 10b, 10d such that they can move longitudinally relative to each other but not in a transverse direction. The two claws 14bi-bii, 14di-dii of the bottom bar supports 13b, 13d are adapted such that they wrap around the interlocking features 16b, 16d. The profile of the interlocking channels 14b, 14d have substantially the same profile as the interlocking features 16b, 16d.

The bottom weld bars 10b, 10d each further include a first hole 17b, 17d and a second hole 18b, 18d adapted to receive air or fluid (which may be a refrigerant) which circulates through the holes and forms part of the cooling device 40.

A main body 2a-d of the weld bars or bar is made of silicon. The main body 2a-d of the bars is covered with a Teflon material (non-stick material) made substantially of polyterafluoroethylene (Teflon) 19a-d. The Teflon material forms the contact surfaces 11a-d of the weld bars. The Teflon material 19a-d is laid over and clamped to the main bodies 2a-d but not chemically bonded to the main bodies 2a-d. The Teflon material 19a-d is folded around sides of the weld bars 10a-d and in between the weld bars 10a-d. The Teflon material 19a-d provides electrical insulation between heating elements 21a-d. The Teflon material 19a-d is adapted to contact the material. The Teflon material 19a-d provides a non-stick coating so that melting plastic of the material does not stick to the contact surfaces 11a-d during the welding process.

In an alternative embodiment, the top and bottom weld bar includes one main body 2e-f. Referring to FIG. 9, the weld bar includes an integrally formed silicon bead or ridge 22. However, it would be appreciated that the bead or ridge may be formed from a separate component. A single main body of the weld bar ensures that the heating elements remain as close together as possible and avoid any possible gap that may occur the during the welding process or processes.

Separate heating elements 21a 21c are located on top of the bottom main body 2e and separate heating surfaces 21b 21d are located bottom of the main body 2f.

Separate heating elements 21a-d are insulated apart from each other by the bead or ridge 22 located in between heating elements 21a-21c and 21b-21d respectively. The bead or ridge 22 runs along the entire length of the weld bar. As described above, the bead or ridge 22 may be integrally formed in the main body, however, it would be appreciated that the bead or ridge 22 may be formed from a separate component without compromising the insulation required between each of the heating elements 21a-21c and 21b-21d. This arrangement assists maintain a constant/consistent distance between the heating elements 21a-21c and 21b-21d located on the top bar assembly and bottom bar assembly.

The weld bar or weld bars may be covered with a Teflon material (non-stick material) made substantially of polytetrafluoroethylene (Teflon) (not shown). The Teflon material is laid over the heating elements on the main body and folded around the sides of the bars. The Teflon material 19a-d is adapted to contact the material. The Teflon material 19a-d provides a non-stick coating so that melting plastic of the material does not stick to the contact surfaces 11a-d during the welding process.

Referring to FIGS. 10 and 11, there is shown the top bar assembly and bottom bar assembly of the material welder having a single weld bar as shown in FIG. 9.

The actuator device 30 includes 8 pneumatic pistons 31a-h. A first end 31i of the pneumatic pistons 31a-h is mounted to the first hollow rectangular beam 57. The first end 31i of the pneumatic pistons 31a-h moves relative to a second end 31ii of the pneumatic pistons. The material welder 1 further includes one support block 32a-h for each pneumatic piston 31a-h. The support blocks 32a-h are mounted to the first hollow rectangular beam 57 and the pneumatic pistons 31a-h, therefore improving the lateral stability of the pneumatic pistons 31a-h. The actuator device 30 further includes 8 pivot mounts 33. The second end 31ii of each of the pneumatic pistons 31a-h is attached to a pivot mount 33. The pivot mounts 33 are also attached to a first and second top bar support 13a, 13c (top bar supports). Therefore, the pivot mounts 33 connect the second end 31ii of each pneumatic piston 31a-h to the top bar supports 13a, 13c. Axles 33i of the pivot mounts 33 are aligned horizontal and perpendicular to longitudinal axes 24a-d of the top bar assembly and bottom bar assembly.

The top bar supports 13a, 13c are identical to each other and are identical to the bottom bar supports 13b, 13d. The top bar supports 13a, 13c are made of an aluminium alloy. The top bar supports 13a, 13c are attached to the weld bar 10e or bars 10a, 10c (top bars) in the same way that the bottom bar supports 13b, 13d are attached to the bottom weld bar 10f or weld bars 10b, 10d as described above. However, top weld bar 10e or weld bars 10a, 10c and the top bar supports 13a, 13c are orientated upside down compared to the bottom weld bar 10f or weld bars 10b, 10d and the bottom bar supports 13b, 13d such that the top bar supports 13a, 13c are on top of the top weld bar 10e or weld bars 10a, 10c.

The surfaces 11a-d are substantially flat. The surfaces 11a, 11c of the top bar assembly are parallel to and face the contact surfaces 11b, 11d of the bottom bar assembly. The first top main body 10a is directly above the first bottom main body 10b and the second top main body 10c is directly above the second bottom main body 10d.

The heating device 20 includes the heating elements 21a-d. The heating elements 21a-d are laid over the surface of the top and bottom weld bars 10a-f and beneath the Teflon material 19a-d. The heating elements 21a-d are flat elongate strips. The heating elements 21a-d substantially span the width of the surfaces 11a-d. The heating elements 21a-d may be made of a nickel and chromium alloy. The heating elements 21a-d may be any material which provides the required resistance and maintains its structural integrity at operating temperatures of the material welder 1. The heating elements 21a-d may be coated in a ceramic. Wires 25 connect the heating elements 21a-d to the power supply.

The heating device 20 further includes 8 tensioning mechanisms 23 with one tensioning mechanism 23 attached to each end of the heating elements 21a-d. The tensioning mechanisms 23 each include a pneumatic piston. Each of the pneumatic pistons are adapted to apply force outwards away from a centre of the heating elements 21a-d therefore applying tension to the heating elements 21a-d. The tensioning mechanisms 23 are adapted to pull the heating elements 21a-d into a state of tension when current is running through the heating elements 21a-d.

The cooling device 40 may include a pump, at least one Peltier device, first and second holes 17a-d, 18a-d and pipes 41. Air or a refrigerant (fluid) may be circulated through the pipes 41, through the first and second holes 17a-d, 18a-d in the top and bottom weld bars 10a-d. Therefore, the cooling device 40 may be adapted to cool the heating elements of the top and bottom bar assembly. The cooling device 40 may further include valves which selectively stop or allow flow of the air or refrigerant through each of the first and second holes 17a-d, 18a-d. The valves may be arranged such that the flow of air or refrigerant can be individually controlled through each of the first and second holes 17a-d, 18a-d. Preferably, the valves are arranged such that the flow of air or refrigerant can be controlled through the top bar assembly and bottom bar assembly separately. The cooling device 40 may include manual switches/levers to control the valves. Preferably, the valves are automatically controlled with a controller.

Preferably, the material welder further includes the controller 80. The controller 80 may include at least one CPU (central processing unit), relay, display, circuit, wire, indicator light, button, switch. The controller 80 may include multiple controllers. Preferably, the controller 80 controls the cooling device 40, the heating device 20 and the actuator device 30. The controller 80 may automatically and selectively control whether electricity runs through the heating elements 21a-d. Preferably, the controller 80 automatically and selectively switches relays which control whether electricity runs through the heating elements 21a-d. Preferably, the controller 80 controls movement of the pneumatic pistons 31a-h. The controller 80 may include switches, buttons or a display screen to manually control at least one of the components of the material welder. The controller 80 may be pre-set with actions in response to an input to automatically control at least one component of the material welder. The components of the material welder may include the heating device, cooling device and actuator. The components of the material welder may include the heating elements 21a-d, the pneumatic pistons 31a-h, the valves of the cooling device 40 and relays for switching each of the components.

Any mentions of the words "mounted", "attached" or similar words throughout the specification may refer to the following attachment methods. The attachment methods may include welding, bolts and nuts, screws, interlocking components, overmoulding or other attachment methods.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, notably with the top bars 10a,c oriented above the bottom bars 10b,d.

It will be appreciated by those skilled in the art that many modifications and variations may be made to the methods of the invention described herein without departing from the spirit and scope of the invention.

We claim:

1. A material welder for welding portions of a material together, including:
   a top bar assembly and a bottom bar assembly, each assembly extending in a longitudinal direction, a portion of the top bar assembly being directly above a portion of the bottom bar assembly, the top bar assembly including a first and second heating element substantially in the same plane and the bottom bar assembly including a first and second heating element substantially in the same plane;
   at least one heating device adapted to selectively heat the first heating elements and/or the second heating elements;
   an actuator device adapted to move the top bar assembly towards the bottom bar assembly and/or the bottom bar assembly towards the top bar assembly such that the first heating element of the top bar assembly aligns with the first heating element of the bottom bar assembly and the second heating element of the top bar assembly aligns with the second heating element of the bottom bar assembly; and
   contact surfaces associated with respective heating elements of each of the bar assemblies adapted to contact the material during a welding process, the contact surfaces comprising:
   top contact surfaces of the top bar assembly; and
   bottom contact surfaces of the bottom bar assembly,
   the top contact surfaces being substantially adjacent one another and the bottom contact surfaces being substantially adjacent one another such that when the top and bottom contact surfaces contact the material and all the heating elements are heated, the resulting weld is substantially continuous in a transverse direction.

2. A material welder as claimed in claim 1, wherein the welding process includes inserting at least two portions of the material between the top bar assembly and the bottom bar assembly, the at least two portions of the material overlapping each other,
   heating the first heating element of the first top bar assembly and the first heating element of the bottom bar assembly, or the second heating element of the top bar assembly and the second heating element of the bottom bar assembly or the first and second heating elements of the top bar assembly and the first and second heating element of the bottom bar assembly, then activating the actuator device to raise the bottom bar assembly and/or lower the top bar assembly until the contact surfaces contact and/or apply force to the material, then raising the top bar assembly and/or lowering the bottom bar assembly.

3. A material welder as claimed in claim 1, wherein the heating device is adapted to selectively heat either the first heating elements or all the first and second heating elements.

4. A material welder as claimed in claim 1, wherein the heating elements of the bottom bar assembly are laid directly under respective bottom contact surfaces and the heating elements of the top bar assembly are laid directly above respective top contact surfaces.

5. A material welder as claimed in claim 1, wherein the top bar assembly and/or the bottom bar assembly further includes at least one hole and/or channel adapted such that fluid or air is circulated through the holes and/or channels and through a cooling device to cool the heating elements.

6. A material welder as claimed in claim 5, further including an electronic controller adapted to control the actuator device and/or the heating device.

7. A material welder as claimed in claim 6, wherein the electronic controller is adapted to control the cooling device.

8. A material welder as claimed in claim 1, wherein at least one tensioning mechanism is attached to each end of each of the heating elements and is adapted to pull the heating elements into a state of tension.

9. A material welder as claimed in claim 1, wherein the actuator device is adapted to move the top bar assembly towards the bottom bar assembly.

10. A material welder as claimed in claim 1, wherein the top bar assembly and bottom bar assembly include at least one weld bar and bar supports with interlocking features.

11. A material welder as claimed in claim 10, wherein the interlocking features include a feature on the at least one weld bar which slots into and is captured by a channel on the bar supports.

12. A material welder as claimed in claim 1, wherein the first and second heating elements are between about 5 to 20 mm wide.

13. A material welder as claimed in claim 1, wherein the contact surfaces of the top bar assembly and/or the contact surfaces of the bottom bar assembly are substantially flat.

14. A material welder as claimed in claim 1, wherein the contact surfaces of the top bar assembly and/or the contact surfaces of the bottom bar assembly are coated with a non-stick material.

15. A material welder as claimed in claim 14, wherein the non-stick material is selected from the group consisting of: polyterafluoroethylene (Teflon), and fluorinated ethylene propylene.

16. A material welder as claimed in claim 1, further including a clamp adapted to secure the material in place during the welding process.

17. A material welder as claimed in claim 1, wherein the actuator device includes multiple pneumatic pistons.

18. A material welder as claimed in claim 1, further including an electronic controller adapted to control the actuator device and/or the heating device.

19. A material welder as claimed in claim 1, wherein the first and second heating elements are between about 8 to 16 mm wide.

20. A material welder as claimed in claim 1, wherein the first and second heating elements are about 10 mm wide.

\* \* \* \* \*